June 3, 1941.    C. N. SUGDEN ET AL    2,244,350
GAUGE
Filed Nov. 19, 1938    2 Sheets-Sheet 2
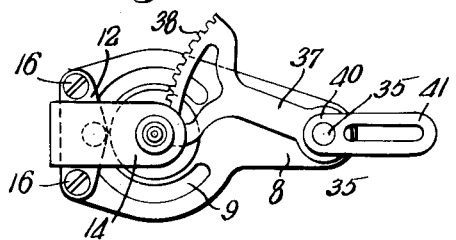
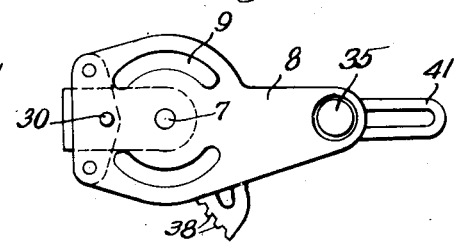
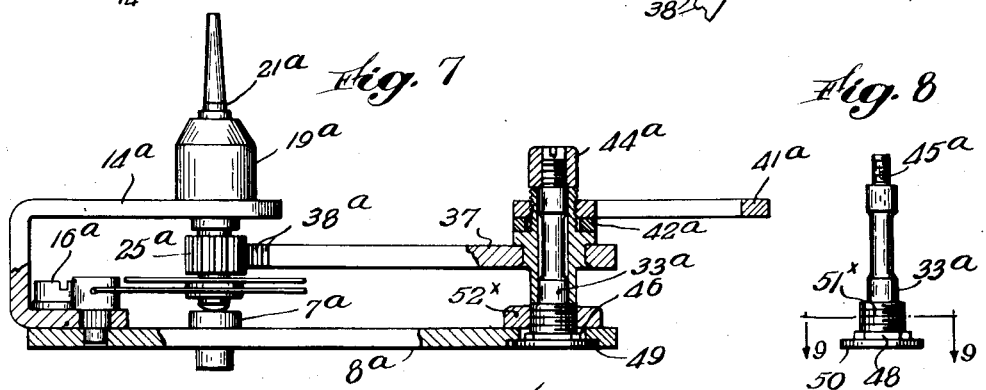
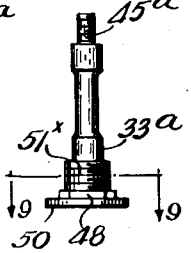
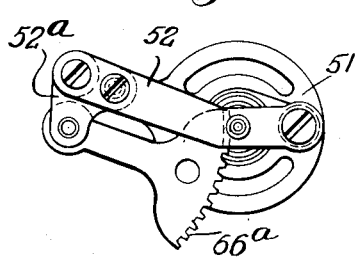
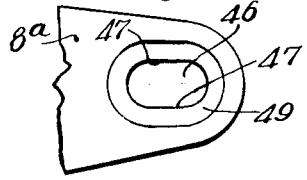
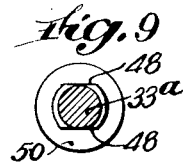
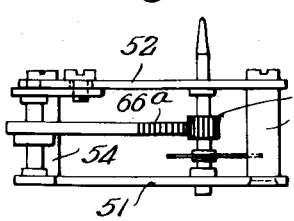
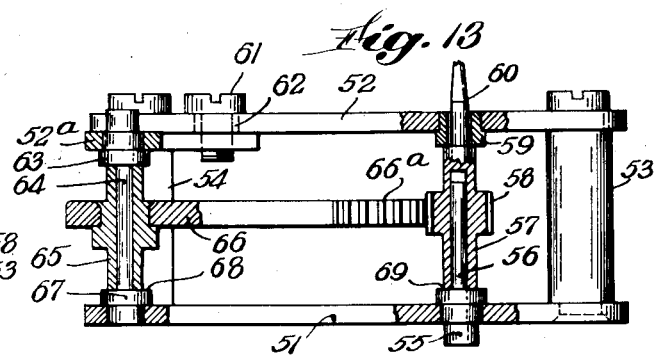
Inventors
Clifford N. Sugden
Samuel Kahn
by Roberts Cushman & Woodberry
Attys.

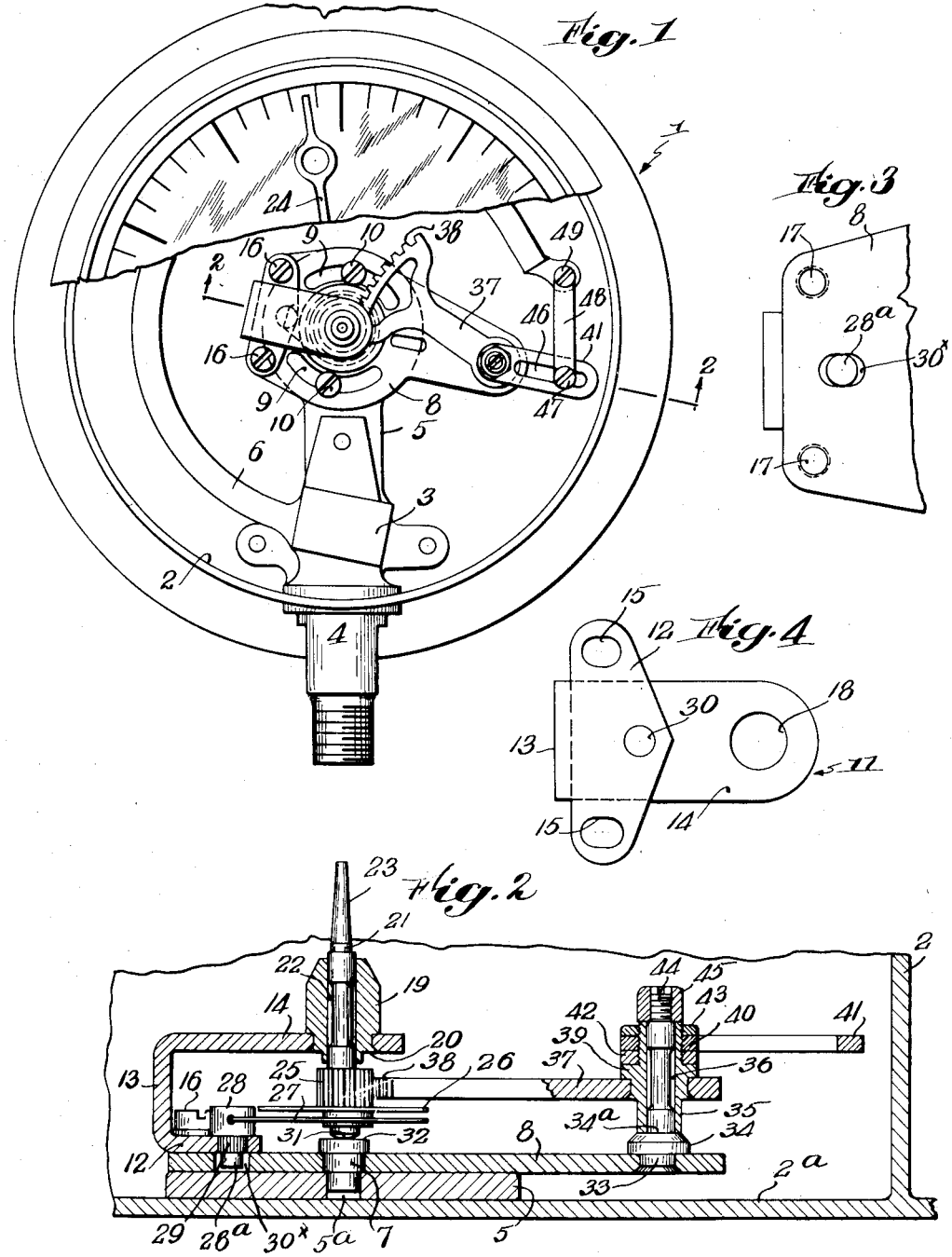

Patented June 3, 1941

2,244,350

UNITED STATES PATENT OFFICE 2,244,350

GAUGE

Clifford N. Sugden, Bridgeport, Conn., and Samuel Kahn, New York, N. Y., assignors to Manning, Maxwell & Moore, Incorporated, New York, N. Y., a corporation of New Jersey Application November 19, 1938, Serial No. 241,478

22 Claims. (Cl. 74—98)

This invention pertains to gauges such, for example, as are used for indicating the pressure of fluid, and relates more particularly to an improved gauge movement designed to provide high accuracy, strength, durability, and simplicity of design, and at the same time to eliminate certain difficulties commonly encountered in manufacturing gauges, particularly when reliability of the completed gauge is regarded by the manufacturer as a matter of substantial importance.

As ordinarily constructed, a gauge movement comprises two substantially parallel supporting plates held in properly spaced relation by shouldered posts or pillars and having openings which form the bearings for the pinion and segment staffs or in which are set bushings which in turn form such bearings. Obviously, in order to ensure accuracy, durability and ease of operation, the bearings in the two plates must be truly aligned; the distance between the axes of the two staffs must be accurately fixed and unchanging since excessive backlash between the segment gear and pinion results in uncertainty of gauge reading as well as excessive wear; the axes of the staffs should be accurately parallel; and the plates must be rigidly and firmly united.

Accordingly, in the manufacture of such gauges the maker, if desirous of producing a truly reliable and accurate mechanism, must consider among others the following factors: First, the proper center-to-center distance between the pillar-locating holes in the two plates; the concentricity of the turned portions at opposite ends of each pillar; the shoulder-to-shoulder distance on each pillar between those turned portions of the pillar which enter the openings in the plate; the squareness and tightness of fit of the turned portions of the pillars in the openings in the respective plates; the accuracy of the distance between centers of the bearing openings for the pinion and segment staffs, or, if bearing bushings are employed, the accurate concentricity of the bearing openings in the bushings and the outer surfaces of the bushings; the accurate location of the bearing openings and the pillar-receiving openings in the plates, both as respects each plate independently and in the final assembly in which the two plates are held in spaced relation by the pillars; the exactness with which the pitch diameters of the pinion and segment gear can be made and maintained; and the accuracy of alignment of the bearings at opposite ends of each of the staffs. In accordance with the present invention many of the above factors may be eliminated from consideration in manufacturing the gauge, but without sacrifice of the desirable qualities of accuracy, durability and simplicity in construction. Thus, in accordance with the present invention the usual top plate is omitted, and for this reason no pillars are necessary. Each staff is journaled to turn in a single elongate bearing and is supported against endwise movement by a simple thrust bearing engaging one end of the staff. Provision is also made for shifting the axis of one staff bodily toward and from the other by what amounts substantially to a micrometer adjustment so that it is possible to take up backlash between the pinion and segment gear and thus ensure smooth and accurate running of the gauge movement.

Since each staff has but a single bearing sleeve or bushing, the problem of attempting to ensure accurate concentricity of bearings at opposite ends of each staff is eliminated, while the use of the single bearing permits centerless grinding or other highly accurate and positive manufacturing methods of controlling final diameter and smoothness. With this arrangement the concentricity of the internal bearing opening in the bushing with respect to the opening in the support for such bushing is of little consequence by reason of the provision for bodily adjustment of the staffs toward and from each other. Thus the internal bearing openings in the bushing may be finished, for example by reaming in the screw machine in which they are made, without necessitating any further finishing or particular care in installing them in the supporting members of the gauge movement. Moreover, by the use of a single bearing in place of two spaced bearings, it is permissible to employ a bearing of larger than usual diameter, thus ensuring sturdiness of construction without adding undue weight.

Referring to the accompanying drawings wherein certain desirable embodiments of the invention have been disclosed by way of example, Fig. 1 is a front elevation of a conventional Bourdon pressure tube gauge with the gauge glass and dial partly broken away to show the gauge movement, the latter embodying the improved construction of the present invention;

Fig. 2 is a fragmentary section substantially on the line 2—2 of Fig. 1, but to larger scale;

Fig. 3 is a fragmentary bottom view of the base or supporting plate for the improved gauge movement;

Fig. 4 is a rear view of the bracket member which is associated with the main or base plate of the gauge movement and which supports the bearing for the pinion staff;

Fig. 5 is a plan view, to smaller scale, showing the completed movement;

Fig. 6 is a rear or bottom plan view of the gauge movement shown in Fig. 5;

Fig. 7 is a vertical section, generally similar to Fig. 2, but showing a movement of modified construction;

Fig. 8 is a side elevation of an adjustable pintle pin used in the arrangement of Fig. 7 to define the axis about which the sector staff turns;

Fig. 9 is a horizontal section on the line 9—9 of Fig. 8;

Fig. 10 is a fragmentary bottom plan view of the right-hand end portion of the base plate of the gauge movement of Fig. 7;

Fig. 11 is a plan view of a gauge movement of further modified construction;

Fig. 12 is a side elevation of the gauge movement of Fig. 11; and

Fig. 13 is a section generally similar to Fig. 2, but showing the gauge movement of Fig. 11 to larger scale.

Referring to the drawings, the numeral 1 designates a Bourdon pressure gauge of conventional type except that it embodies the features of improvement constituting the present invention. This gauge includes the usual case 2 open at the front and provided with a dial and glass coverplate and encloses a fitting 3 fixed within the case and having a nipple 4 which projects out through the side wall of the case for attachment to a pipe for pressure fluid. The fitting 3 supports the bracket 5 on which the gauge movement is mounted and also supports one end of the Bourdon tube 6. The member 5 which carries the gauge movement is rigidly, though it may be removably, secured at its lower end to the fitting 3 and preferably has a substantially circular plate-like upper portion provided with an opening 5ª (Fig. 2) at its center for the reception of a pivot stud 7 upon which the base plate 8 of the gauge movement is mounted for rotary adjustment. This base plate 8 is conveniently of sheet metal of a thickness such that it forms a rigid support for the gauge movement and is furnished with arcuate slots 9 concentric with the stud 7 for the reception of screws 10 which enter threaded holes in the support 5 and which normally hold the base plate 8 in properly adjusted position.

At the left-hand side of the base plate 8 as viewed in Figs. 1 and 2, there is provided a bracket 11 (Fig. 4) comprising a foot portion 12 which rests upon the forward face of the base plate 8; an upright member 13, and an arm 14 which is substantially parallel to the base plate and which overhangs the stud 7. This bracket is of strong and rigid material and is so formed that the parts 12 and 14 are accurately parallel. The foot 12 is furnished with a pair of elongate openings 15 (Fig. 4) designed to receive screws 16 which enter threaded openings 17 (Fig. 3) in the base plate 8. By loosening these screws 16 the entire bracket 11 may be moved from right to left as viewed in Fig. 2, relatively to the base plate 8, but the bracket is normally held rigidly to the base plate by the screws 16.

The overhanging arm 14 of the bracket is furnished with an opening 18 (Fig. 4) directly above the pivot stud 7 and in this opening is seated the lower end of an elongate rigid bearing sleeve or bushing 19. The lower end of this sleeve or bushing is swedged over at 20 so as rigidly to unite the sleeve or bushing to the arm 14 of the bracket. This sleeve or bushing 19 has an elongate journal opening therethrough, such opening being accurately finished to provide a journal bearing for the pinion staff 21. If desired, this staff may be relieved at 22 between its end portions, thereby to reduce the friction, but its end portions are accurately finished to form journals having a turning fit within the sleeve or bushing 19. The outer end 23 of the staff 21 is preferably tapered for the reception of an index or pointer arm 24. A pinion 25 is fixed to the staff 21 at a point between the inner end of the stud 7 and the adjacent end of the bushing 19. Preferably an inertia disk 26 is also secured to the staff 21 adjacent to the pinion and one end of a hair spring 27 is also fixed to the staff adjacent to the disk 26, the opposite end of the hair spring being anchored to a stud 28 which is secured with a driving fit at 29 in an opening 30 in the foot 12 of the bracket 11. Preferably the stud 28 has an end portion 28ª of smaller diameter which fits into an elongate slot 30× in the base plate 8, thus assisting in guiding the bracket 11 when the latter is adjusted longitudinally of the base plate 8. The inner end of the staff 21 is rounded or of more or less spherical contour, as shown at 31 and rests upon the flat end surface 32 of the stud 7. This end surface 32 constitutes a thrust bearing for the staff 21 and may be hardened or of a suitable wear-resistant material.

At the right-hand end of the base plate 8, as viewed in Fig. 2, the plate is furnished with an opening for the reception of the end portion of a pintle pin 33 having a radial shoulder 34 which bears against the forward face of the plate 8, the end of the pin being swedged to provide a rigid union between the pin and the plate. That portion of the pin which projects beyond the shoulder 34 constitutes a pintle upon which turns the hollow or tubular staff 35. The upper surface of the shoulder 34 is finished at 34ª to provide a thrust bearing for the rear end of the hollow staff 35. The end portions of the pintle are accurately finished to provide a journal bearing for the staff 35. If desired the pintle may be relieved at 36 between its end portions to reduce friction. Intermediate its ends the hollow staff 35 passes through an opening in one end of a segment arm 37 provided with the usual gear segment 38 meshing with the pinion 25. The arm 37 is fixedly secured to the staff 35 in any desired manner, for example by swedging. The arm 37 bears against a radial abutment flange 39 on the staff 35 and beyond this flange the staff is externally screw threaded and enters a threaded opening in one end 40 of an alongate slotted lever arm 41. Between the end 40 of the arm 41 and the flange 39 there is interposed a spring washer 42. With this arrangement the arm 41 may be adjusted angularly with reference to the staff 35 through an angle of as much as 360°, and ordinarily the spring washer is sufficient to retain the arm in adjusted position. However, if desired a lock nut 43 may be threaded onto the end of the staff 35 thereby positively to hold the arm 41 in adjusted position. The wide range of angular adjustment thus provided for the arm 41 adapts the gauge movement for use in a gauge having a single Bourdon tube, as shown in Fig. 1, alternatively for use in a differential type of gauge in which two Bourdon tubes are used and in which it is desirable to have the arm 41 which is connected to one of the Bourdon tubes, extend inwardly toward the pinion staff 21 rather than outwardly as is here illustrated.

For retaining the staff 35 in assembled relation with the pintle 35 the latter is preferably screw threaded at its outer end, as shown at 44, for the reception of a retaining nut 45.

The arm 41 is provided with an elongate slot 46 which receives a stud 47 at the end of a link 48 which is pivotally secured by means of a stud 49 to the free end of the Bourdon tube 6. By this arrangement movement of the free end of the tube in response to pressure variation is transmitted through the link 48 and arm 41 to the staff 35, thereby rocking the latter on the pintle, and causing the segment gear 38 to turn the pinion 25 and thus to rotate the pinion staff 21 and the index 24.

In the arrangement thus far described the gauge movement is entirely devoid of the usual spacing posts or pillars and each of the staffs 21 and 35 is furnished with a single elongate journal bearing which receives its support at one end only. While an end thrust bearing is furnished for each of the staffs, the end thrust bearing is in each instance a simple plane surface substantially perpendicular to the axis of the staff and exerting no restraint upon the staff so far as its turning movement is concerned. Further it will be noted that the bearing sleeve 19 may be moved bodily so as to shift the axis of the staff 21 toward and from the axis of the staff 35 but without changing their normal parallel relation, the end of the staff 21 sliding freely over the thrust bearing surface 32 during such adjustment. By the provision of this adjustment it is possible to take up any inaccuracies in wear or lost motion between the pinion 25 and the segment gear 38 and since in each instance the fixed bearing member, that is to say the sleeve 19 or the pintle 33 respectively, is secured to the movement frame at one end only it is possible to finish these parts, as well as the parts which rotate in contact with them, very accurately and before assembly, with the assurance that they will run truly and accurately after being assembled.

While in the arrangement illustrated in Figs. 1 to 4 inclusive it is the pinion staff which is bodily adjustable for the purpose of taking up lost motion and backlash between the pinion and segment gear, it is contemplated that the pintle member may be bodily movable for the same purpose. Thus, as illustrated in Figs. 7 to 10 inclusive, most of the constituent parts of the movement, including the base plate 8ª, the bracket with its overhanging arm 14ª, the staff 21ª, the bearing 19ª, the pinion 25ª, the pintle 33ª, the segment arm 37ª, the gear segment 38ª, the slotted arm 41ª, the spring washer 42ª and the retaining nut 44ª, are substantially identical with corresponding parts of the gauge movement illustrated in Figs. 1 to 4. In this instance also the bracket, including the arm 14ª, may be bodily adjustable in the same way as the bracket 11 of Figs. 1 to 4. However, if desired, it may be rigidly secured to the base plate 8ª with no provision for adjustment, in which event the screws 16ª would pass through circular openings in the foot of the bracket instead of passing through elongate openings.

In the arrangement, as shown in Figs. 7 to 10, the right-hand end of the base member 8ª (as viewed in Figs. 7 and 10) is furnished with an elongate opening 46 having substantially parallel straight side walls 47 (Fig. 10), and the pintle 33ª is provided with a head having parallel sides 48 (Fig. 9) designed to slide in contact with the walls 47 of the opening 46. At the rear side of the base 8ª the opening 46 is enlarged and receives a substantially circular disk 50 fixed to the rear end of the pintle 33ª. The pintle also has a portion 51× which is externally screw threaded and which receives a locking nut 52× which engages the front surface of the base member 8ª and which clamps the pintle 33ª firmly and rigidly to the base plate. However, by loosening this nut the head of the pintle may be moved bodily in the elongate slot or opening 46 so as to cause the axis of the pintle to approach or recede from the axis of the staff 21ª. Thus, whether or not the bracket which carries the bearing 19ª for the pinion staff is adjustable relatively to the base plate 8ª, it is possible to take up wear or backlash between the pinion 25ª and the segment 38ª by loosening the nut 46 and moving the pintle 33ª together with the segment arm 37 longitudinally of the base plate 8ª.

While the invention as above outlined is particularly desirable in its embodiment in a gauge movement which does not require the usual spacing posts and parallel movement supporting plates, certain desirable features of the invention may be well employed in a gauge movement of more conventional type. Thus, as illustrated in Figs. 11 to 13 inclusive, the gauge movement frame comprises parallel plates 51 and 52 which are held in spaced relation by means of the shouldered posts or pillars 53 and 54. The plate 51 is furnished with a pivot stud 55 about which the entire movement may be rotated with reference to the gauge casing, but in this instance this pivot stud is furnished with an extension 56 constituting a pintle member on which turns the hollow pinion staff 57. As here illustrated this staff is provided with a portion 58 having gear teeth and constituting the pinion. The upper end of the staff 57, as viewed in Fig. 13, is extended outwardly through a bushing 59 set in an opening in the upper plate 52 and forms the pin 60 on which is mounted the pointer or index. As herein illustrated the bushing 59 has an opening of such diameter as to provide clearance between it and the member 60 and merely serves as a support for the staff 57 when subjected to extreme transverse vibrations. Normally the turning of the staff is wholly controlled by the pintle member 56—the pintle and staff being provided with finely finished engaging surfaces so that the staff turns on the pinion with great precision and accuracy.

The plate 52 carries an adjustable bracket member 52ª which is conveniently mounted to swing on a reduced end portion of the pillar 54. This bracket is held in adjusted position by means of a stud 61 passing through a slot 62 in the plate 52 and which enters a threaded opening in the bracket 52ª. The bracket 52ª is provided with an opening which receives a stud 63 preferably having a driving fit in said opening and which is furnished with extension 64 constituting a pintle on which turns the hollow segment staff 65. To this hollow staff is fixedly secured the segment arm 66 carrying the gear segment 66ª which meshes with the pinion 58.

The rear plate 51 of the movement frame is preferably furnished with a stud 67 aligned with the pintle 64 and having an end surface 68 which is finished smooth and substantially flat and which constitutes a thrust bearing for the staff 65. Likewise the forward end surface 69 of the stud 55 is finished to provide a thrust bearing for the rear end of the staff 57, the inner ends of bushings 59 and 63 forming thrust bearings for the forward ends of staffs 57 and 65, respectively.

While in this arrangement the movement frame comprises spaced plates and spacing pillars, it may be noted that both of the staffs are provided with journal bearings which in each instance are supported by one only of the frame plates so that each staff is wholly free to turn about its axis without reference to the accuracy with which the two frame plates are assembled and held in relation. Thus it is possible with this arrangement, as in those previously described, to impart to the relatively rotating parts the desired accuracy of fit and finish before assembling the movement, and no particular care is requisite in assembling the movement since the freedom of rotation of the rotating parts is not substantially affected by the relative position of the plates.

As specifically illustrated, the end thrust bearing for the rotating member is formed upon a stud or the like separate from the base plate, but it is within the purview of the invention to form the end thrust bearing as an integral part or portion of the base plate itself, and in such event, the plate may, if desired, be locally hardened at the bearing point.

While certain desirable embodiments of the invention have herein been illustrated by way of example, it is to be understood that the invention is not necessarily limited to these precise embodiments but is to be regarded as broadly inclusive of any and all equivalents and substitution of materials for those herein specifically disclosed.

I claim:

1. A gauge movement of the kind having a segment staff, a pinion staff spaced from but parallel to the segment staff, a pinion fixed to the pinion staff, and a gear segment carried by the segment staff, characterized in having a single journal bearing for the pinion staff disposed wholly to one side of the pinion and which constitutes the sole means for keeping the axis of said staff in line during operation of the gauge.

2. A gauge movement of the kind having a segment staff, a pinion staff spaced from but parallel to the segment staff, a pinion fixed to the pinion staff, and a gear sector carried by the segment staff, characterized in that the pinion staff has a single elongate journal bearing which is located wholly at one side of the pinion and which constitutes the sole means for keeping the axis of said staff in line during operation and in that a thrust bearing having a substantially flat bearing surface perpendicular to the axis of the staff engages the end surface only of the pinion staff at the opposite side of the pinion.

3. A gauge movement of the kind having a segment staff, a pinion staff spaced from but parallel to the segment staff, a pinion fixed to the pinion staff, and a gear segment carried by the segment staff, characterized in that said movement comprises a single journal bearing for the pinion staff in which said staff rotates, and an end thrust bearing for the pinion staff operative to position it endwise, said end thrust bearing having a substantially flat bearing surface, the journal bearing being bodily shiftable relatively to the end thrust bearing, and means operative to shift the journal bearing bodily in a direction perpendicular to the axis of the pinion staff.

4. A gauge movement of the kind having a segment staff, a pinion staff spaced from but parallel to the segment staff, a pinion fixed to the pinion staff, and a gear segment carried by the segment staff, characterized in that said movement comprises a single journal bearing for the pinion staff, a single journal bearing for the segment staff, and means operative to shift one of said bearings bodily relatively to the other in a direction substantially perpendicular to the axes of the staffs.

5. A gauge movement of the kind having a segment staff, a pinion staff spaced from but parallel to the segment staff, a pinion fixed to the pinion staff, and a gear segment carried by the segment staff, said movement comprising a pair of supports, one of which is movable relatively to the other in a plane substantially perpendicular to the axes of the staffs, characterized in having a single journal bearing for each of the staffs, each such journal bearing constituting the sole means for keeping the axis of its respective staff in line during operation of the gauge one bearing being carried by each of the respective supports.

6. A gauge movement of the kind having a segment staff, a pinion staff spaced from but parallel to the segment staff, a pinion fixed to the pinion staff, and a gear segment carried by the segment staff, said movement comprising a pair of supports, one of which is movable relatively to the other, characterized in that a fixed pintle is carried by each of the supports, said pintles being parallel to each other and defining axes about which the pinion and staff turn respectively.

7. A gauge movement of the kind having a segment staff, a pinion staff spaced from but parallel to the segment staff, a pinion fixed to the pinion staff, and a gear segment carried by the segment staff, said movement comprising supporting means, and means carried thereby defining parallel axes about which the pinion and staff turn respectively, characterized in that the parts are so designed and arranged as to permit bodily movement of one of said staffs relative to the other in a direction perpendicular to the axes of the staffs.

8. A gauge movement of the kind having a segment staff, a pinion staff spaced from but parallel to the segment staff, a pinion fixed to the pinion staff, and a gear segment carried by the segment staff, said movement comprising supporting means, characterized in having an elongate bearing and an elongate pintle carried by the supporting means, said bearing and pintle defining axes about which the two staffs rotate respectively, and in having means providing for relative movement of the bearing and pintle in a direction perpendicular to the axes of the staffs.

9. A gauge movement of the kind having a segment staff, a pinion staff spaced from but parallel to the segment staff, a pinion fixed to the pinion staff, and a gear segment carried by the segment staff, said movement comprising supporting means, characterized in having an elongate bearing and an elongate pintle carried by the supporting means, said bearing and pintle defining axes about which the two staffs rotate respectively, and further characterized in having means providing for relative bodily movement of the pintle and bearing toward and from each other.

10. A gauge movement of the kind having a segment staff, a pinion staff spaced from but parallel to the segment staff, a pinion fixed to the pinion staff, and a gear segment carried by the segment staff, said movement comprising a base plate, characterized in having a pintle rigidly fixed to the base plate, said pintle comprising a thrust bearing portion and an elongate journal portion, the segment staff being hollow and turning on said pintle with one end engaging the thrust bearing portion of the latter, and further characterized in having a single elongate journal bearing for the pinion staff, and movably adjustable means carried by the base plate for supporting said bearing.

11. A gauge movement of the kind having a segment staff, a pinion staff spaced from but parallel to the segment staff, a pinion fixed to the pinion staff, and a gear segment carried by the segment staff, said movement comprising a base plate provided with a bracket arm overhanging and substantially parallel to the body portion of the base plate, characterized in having an elongate bearing sleeve fixed in said bearing arm with its axis perpendicular to the body portion of the plate and in having an end thrust bearing carried by the body portion of the plate in alignment with said elongate bearing, the pinion staff turning in the bearing and having its end engaging the thrust bearing, and further characterized in having means fixed to the support defining an axis about which the segment staff turns, the bracket being bodily adjustable with respect to the body portion of the base plate thereby to permit the staffs to be moved toward and away from each other.

12. A gauge movement of the class described comprising a base provided with an element operative as a thrust bearing, a rigid bracket mounted on the base and having a portion which overhangs the thrust bearing element, a bearing sleeve supported by said overhanging portion of the bracket with its axis substantially perpendicular to the plane of the thrust bearing element, a staff arranged to turn in said bearing with one end resting on the thrust bearing element, said bearing sleeve constituting the sole means for keeping the axis of said staff in line during operation of the gauge, and a toothed gear element fixed to the staff intermediate the thrust bearing element and the adjacent end of the bearing sleeve.

13. A gauge movement of the class described comprising a base plate, a thrust bearing mounted on the base plate, a rigid bracket mounted on the base plate and having a portion which overhangs the thrust bearing member, a bearing sleeve supported by said overhanging portion of the bracket with its axis substantially perpendicular to the plane of the base plate, a pinion staff arranged to turn in said bearing sleeve, said sleeve constituting the sole means for keeping the axis of the staff in line during operation of the gauge, one end of the staff engaging the thrust bearing and the opposite end portions of the staff projecting from the bearing sleeve and having an index pointer secured thereto, and a pinion fixed to the staff intermediate the thrust bearing member and the adjacent end of the sleeve bearing.

14. A gauge movement of the class described comprising a base plate provided with a pivot stud defining an axis about which the entire movement may swing, said stud having an end surface constituting an end thrust bearing, a rigid support carried by the base plate and overhanging the stud, an elongate bearing sleeve carried by said support with its axis substantially perpendicular to the end surface of the stud, and a rotary staff journaled in said bearing with one end resting against said end surface of the stud, said bearing sleeve constituting the sole means for keeping the axis of the staff in line during operation.

15. A gauge movement of the class described comprising a base plate provided with a pivot stud defining an axis about which the entire movement may swing, said stud having an end surface constituting an end thrust bearing, a rigid supporting bracket mounted on the base plate and having a portion which overhangs the stud, an elongate bearing sleeve carried by said overhanging portion of the bracket with its axis perpendicular to the end surface of the stud, a staff turning in said bearing sleeve with one end in contact with the end surface of the stud, a toothed gear element fixed to the staff between the stud and the adjacent end of the bearing sleeve, and means whereby the bracket may be moved with reference to the base plate thereby to shift the axis of the staff.

16. A gauge movement of the class described comprising a hollow staff having external screw threads adjacent to one end, a gear segment secured to the staff intermediate its ends, a motion transmitting arm having an opening in one end which receives the threaded end of the staff, means so securing the arm to the staff as to permit rotary adjustment of the arm through an angle of 360°, and a pintle on which the staff turns.

17. A gauge movement of the class described comprising an elongate bearing sleeve, said bearing sleeve constituting the sole means for keeping the axis of the staff in line during operation of the gauge, a staff turning in said bearing sleeve, an end thrust bearing having a bearing surface perpendicular to the axis of the staff and against which one end of the staff rests, and a toothed gear element fixed to the staff intermediate the thrust bearing and the adjacent end of the bearing sleeve.

18. A gauge movement of the class described comprising an elongate bearing sleeve, said bearing sleeve constituting the sole means for keeping the axis of the staff in line during operation of the gauge, a staff turning in said bearing sleeve, an end thrust bearing having a bearing surface perpendicular to the axis of the staff and against which one end of the staff rests, and a toothed gear element fixed to the staff intermediate the thrust bearing and the adjacent end of the bearing sleeve, and means so supporting the bearing sleeve as to permit it to be moved bodily in a direction transverse to the axis of the staff.

19. A gauge movement of the class described having a staff and a toothed gear element fixed to the staff intermediate its ends, journal means for the staff located wholly to one side of the pinion, said journal means constituting the sole means for keeping the axis of the staff in line during operation of the gauge, and a substantially flat thrust bearing surface perpendicular to the axis of the staff with which one end of the staff contacts.

20. A gauge movement of the class described comprising a staff, a toothed gear element fixed to the staff, means so supporting the staff for rotation as to leave one end of the staff free, a motion transmitting arm mounted on the latter end of the staff, and means so uniting said arm to the staff as to permit angular adjustment of the arm on the staff through an angle of 360°.

21. A gauge movement of the class described comprising a staff, a toothed gear element fixed to the staff, means so supporting the staff for rotation as to leave one end of the staff free, a motion transmitting arm mounted on the latter end of the staff, the staff having an external abutment shoulder spaced from said end, the staff being externally screw threaded between said end and the abutment shoulder, the arm having an opening which receives the threaded end of the staff, a spring washer interposed between the arm and shoulder, and a nut which clamps the arm against the washer and normally prevents relative rotation of the arm and staff.

22. A gauge movement comprising a base having an opening therein, the opening being elongate and having substantially parallel side walls, a pintle provided with a head having parallel edge surfaces which engage the side walls of the opening in the base with a sliding fit, thereby permitting the pintle to be moved bodily with reference to the base, the pintle having a disk member of a diameter exceeding the width of said opening and which engages the rear side of the base and having a screw-threaded portion which receives a nut engaging the forward surface of the base thereby to retain the pintle in adjusted position, and a hollow staff journaled to turn on the pintle.

CLIFFORD N. SUGDEN.
SAMUEL KAHN.